(12) United States Patent
LeTournoux

(10) Patent No.: US 6,663,180 B2
(45) Date of Patent: Dec. 16, 2003

(54) VEHICLE SEAT PROVIDED WITH A FOLD-DOWN BACK

(75) Inventor: Alain LeTournoux, St-Jean-le-Blanc (FR)

(73) Assignee: Faurecia Sieges d'automobile S.A., Boulogne (FR)

( * ) Notice: Subject to any disclaimer, the term of this patent is extended or adjusted under 35 U.S.C. 154(b) by 44 days.

(21) Appl. No.: 10/071,727

(22) Filed: Feb. 7, 2002

(65) Prior Publication Data

US 2002/0125757 A1 Sep. 12, 2002

(30) Foreign Application Priority Data

Feb. 15, 2001 (FR) .............................................. 01 02073

(51) Int. Cl.⁷ ................................................. B60N 2/36
(52) U.S. Cl. ................................................. 297/378.12
(58) Field of Search ........................ 297/378.12, 378.14

(56) References Cited

U.S. PATENT DOCUMENTS

| 4,874,205 | A | * | 10/1989 | Arefinejad et al. ..... 297/378.12 |
| 5,249,840 | A | * | 10/1993 | Hoshihara et al. ..... 297/378.12 |
| 5,393,116 | A | * | 2/1995 | Bolsworth et al. .. 297/378.12 X |
| 5,454,624 | A | * | 10/1995 | Anglade et al. .... 297/378.12 X |
| 5,577,805 | A | * | 11/1996 | Glinter et al. ......... 297/378.12 |
| 2002/0135216 | A1 | * | 9/2002 | Hamelin et al. ........ 297/378.12 |
| 2003/0080601 | A1 | * | 5/2003 | Charras et al. ........ 297/378.12 |

* cited by examiner

*Primary Examiner*—Rodney B. White
(74) *Attorney, Agent, or Firm*—Marshall, Gerstein & Borun LLP

(57) ABSTRACT

A vehicle seat having a back that can be folded down, which back has a top portion that is normally locked in a raised position by a pivoting cam which is urged resiliently towards a locking position in which said cam co-operates with a peg by coming into abutment therewith to prevent the back from moving. The cam can be moved by a control member towards a retracted position so as to allow the top portion of the back to be folded down into a horizontal position.

10 Claims, 8 Drawing Sheets

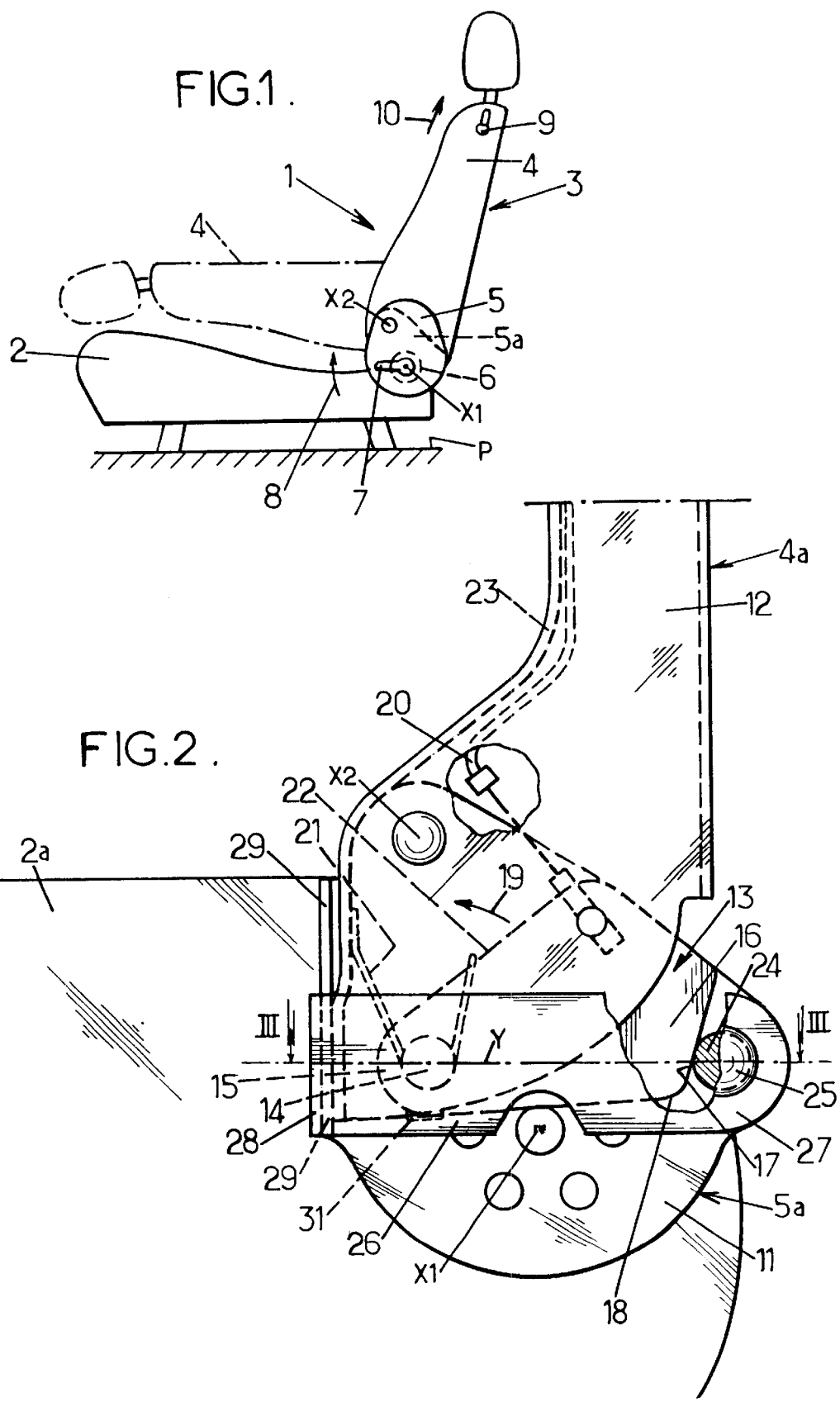

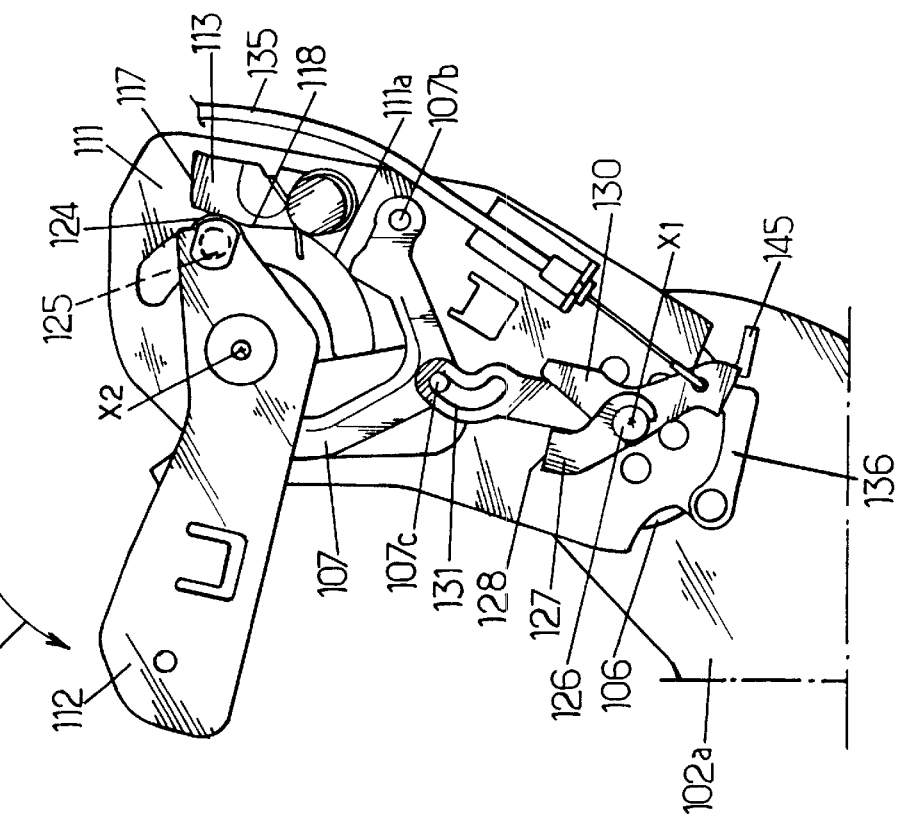
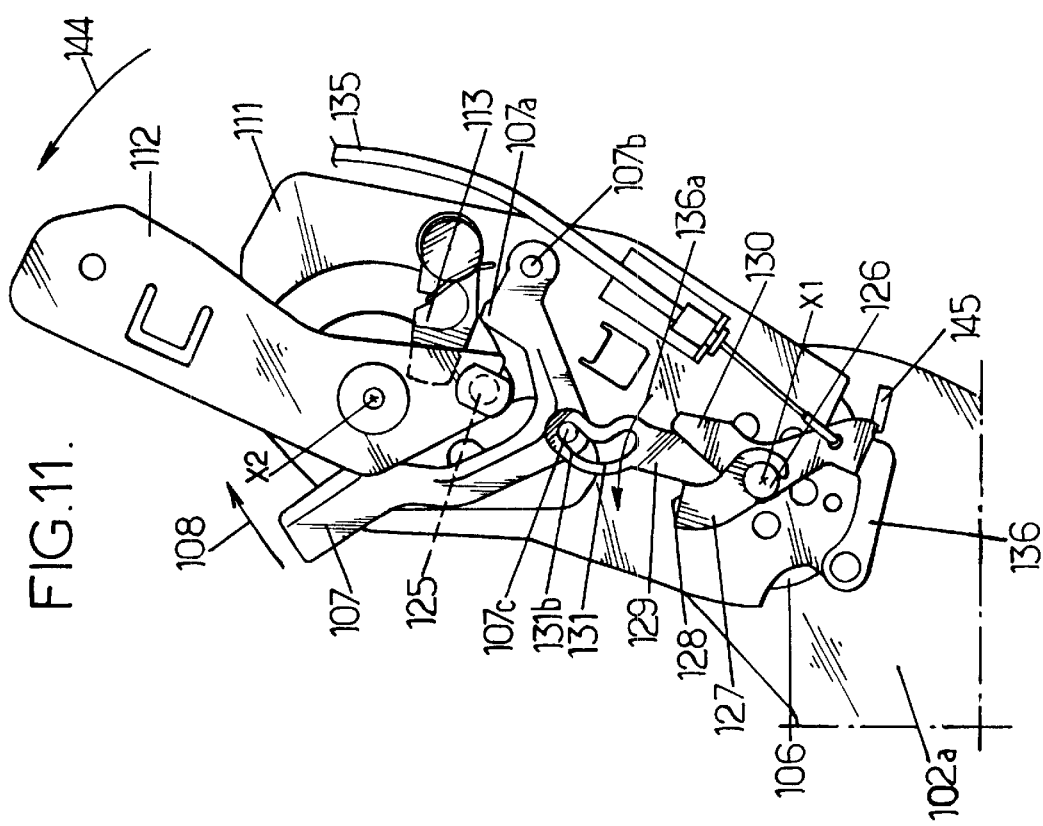

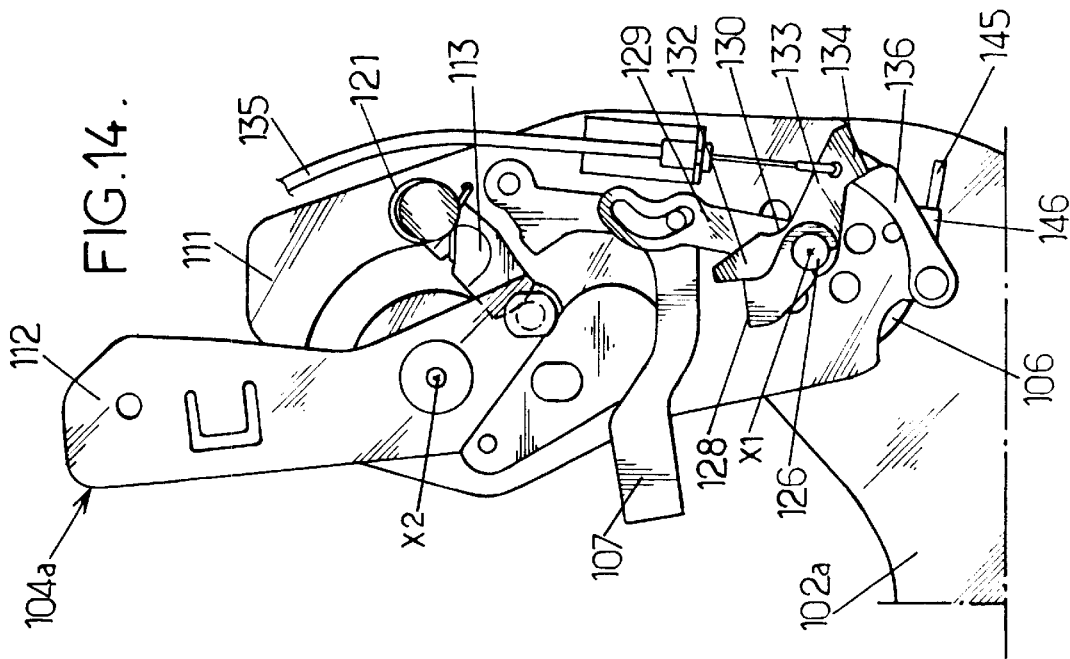
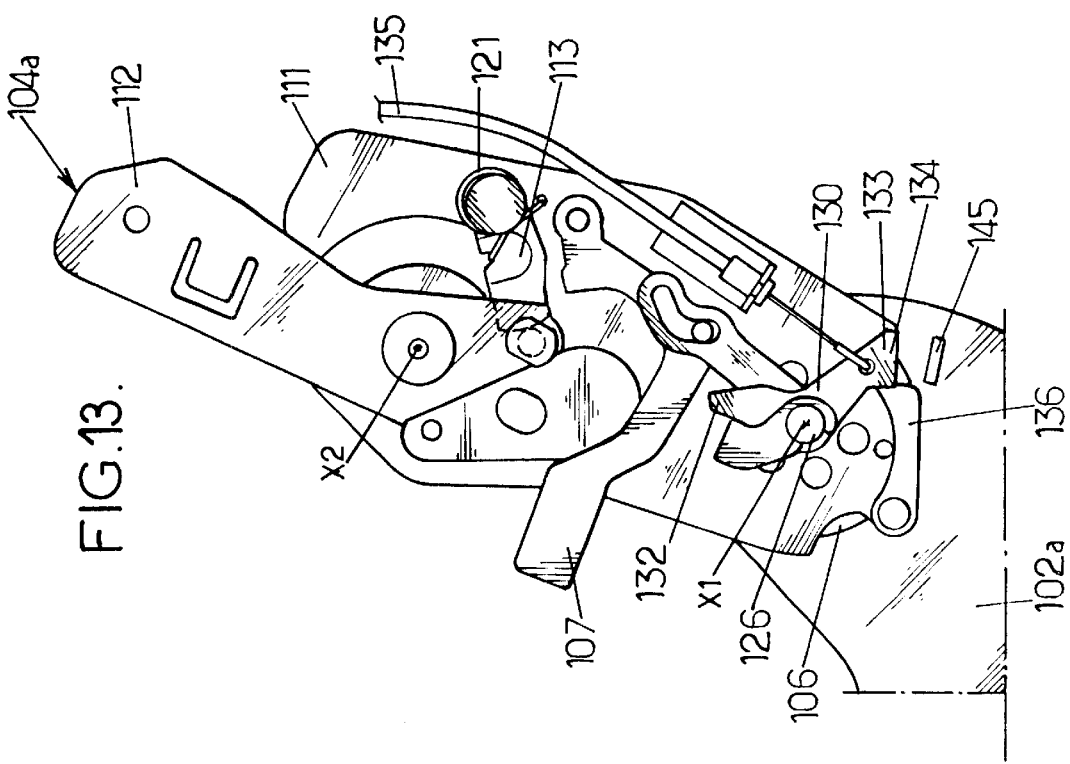

VEHICLE SEAT PROVIDED WITH A FOLD-DOWN BACK

FIELD OF THE INVENTION

The present invention relates to vehicle seats provided with backs that can be folded down.

More particularly, the invention relates to a vehicle seat comprising a back and a seat proper, the back having at least a top portion mounted on a supporting strength member to pivot about a transverse horizontal pivot axis, said supporting strength member being connected to the seat proper (this supporting strength member can, in particular, constitute a portion of the seat proper, or it can form a bottom portion of the back, and it can be pivotally mounted to the seat proper by means of a hinge mechanism adapted to adjust the inclination of the back as a whole in order to improve comfort for the seat passenger), said top portion of the back being connected to the supporting strength member by a locking mechanism adapted to connect the top portion of the back to the supporting strength member at least in a raised, normal-use position, the locking mechanism being actuated by a control member accessible to a user to release the top portion of the back to pivot about said pivot axis, at least in order to enable it to pivot forwards from the raised position to a folded-down position.

BACKGROUND OF THE INVENTION

Document FR-A-2 770 811 describes an example of such a vehicle seat, in which the locking mechanism comprises a hook mounted to pivot on the top portion of the back and engaging in a cutout secured to the strength member of the support. Although the device described in that document gives full satisfaction in terms of operation, that type of locking mechanism is expensive, in particular insofar as the hook and the piece in which the hook engages are usually made by a fine cutting-out process that is relatively expensive.

OBJECTS AND SUMMARY OF THE INVENTION

A particular object of the present invention is to mitigate that drawback.

To this end, according to the invention, in a seat of the kind in question, the locking mechanism comprises a locking cam pivotally mounted on a first seat element selected from the supporting strength member and the top portion of the back, the locking cam being urged resiliently towards a locking position and being movable towards a retracted position by actuating said control member, which member is carried by said first seat element, the locking cam having a bearing edge and a guide edge, and said locking cam being positioned and shaped so that:

when the top portion of the back is in the raised position and the locking cam is in the locking position, the bearing edge of said locking cam is wedged against a rigid peg fixed to a second seat element selected from the supporting strength member and the top portion of the back, said second seat element being different from the first seat element, the locking cam then preventing the top portion of the back from being folded down forwards and said top portion of the back then co-operating with the supporting strength member by coming into abutment therewith to prevent said top portion of the seat back from pivoting rearwards;

when the locking cam is in the retracted position, it does not interfere with said peg and it enables the top portion of the seat back to pivot from its raised position to its folded-down position; and when the top portion of the back is in the folded-down position, said back can be raised freely, the locking cam then being disposed so that it does not lock against the peg, said locking cam being disposed so that its guide edge is in sliding contact against the peg at least during a portion of the raising stroke of the top portion of the back, the locking cam and the peg being disposed so that the peg slides along the guide edge of the locking cam towards the bearing edge when the top portion of the back pivots towards its raised position, the bearing edge of the locking cam being adapted to wedge against the peg when the top portion of the back returns to its raised position.

By means of these dispositions, the locking mechanism of the top portion of the back can be made in a low-cost manner since:

firstly the peg is a separate part that can be made at low cost; and secondly the cam co-operates with the peg by a wedging effect, thereby accommodating any small lack of precision in manufacturing the cam or in assembling the cam or peg: this makes it possible to obtain locking that is very strong and snug for the top portion of the back while nevertheless using a standard manufacturing process for making the cam and assembling the seat, thus further reducing the cost price of the seat.

In addition, the cam is made easier to control by the fact that the cam and the control member are both carried by the same portion of the seat.

In preferred embodiments of the invention, use may optionally be made of one or more of the following dispositions:

the locking cam extends in a longitudinal direction between a first end pivotally mounted on the first element of the seat and a second end which includes the bearing edge of the locking cam, the guide edge of the locking cam extending between said first end and the bearing edge, the cam thus being braced against the peg of the second element of the seat while said locking cam is in the locking position, and the top portion of the back is in the raised position;

the bearing edge of the cam is shaped in such a manner that said locking cam cannot itself pass into the retracted position without a user actuating the control member when the bearing edge of the locking cam is wedged against the peg of the second element of the seat;

the locking cam is a piece of sheet metal having first and second main faces, the first main face of the locking cam being in sliding contact against a first side plate belonging to the first element of the seat and extending parallel to the locking cam;

the second element of the seat comprises a second rigid side plate which is parallel to the first side plate and which is secured to said peg, the locking cam being located at least in part between the first and second side plates, at least when the locking cam is in the locking position and the top portion of the back is in the raised position;

the second side plate is spaced apart from the second main face of the locking cam by a distance which is less than 3 millimeters (mm);

the second element of the seat includes a third side plate which is parallel to the first and second side plates, the second and third side plates being fixed to each other and defining between them a gap in which the first side plate and the locking cam are received, at least when the locking cam is in the locking position and the top portion of the back is in the raised position;

the second and third side plates are fixed to each other, firstly via the peg and secondly via at least one link wall which interconnects the second and third side plates and which co-operates with the first side plate by coming into abutment therewith to prevent rearward pivoting of the top portion of the back when said top portion of the back is in the raised position;

the first element of the seat is constituted by the top portion of the back and the second element of the seat is constituted by the supporting strength member; and the first element of the sea: is constituted by the supporting strength member and the second element of the seat is constituted by the top portion of the back.

BRIEF DESCRIPTION OF THE DRAWINGS

Other characteristics and advantages of the invention appear from the following description of two embodiments, given as non-limiting examples and described with reference to the accompanying drawings.

In the drawings:

FIG. 1 is a diagrammatic view of a vehicle seat constituting a first embodiment of the invention, in its normal, in-use position;

FIG. 2 is a detail view of a portion of the strength member of the FIG. 1 seat when the top portion of the seat back is in the raised position;

FIG. 11 shows the top portion of the FIG. 6 seat back being unlocked;

FIG. 12 is a view similar to FIG. 11, when the top portion of the seat back is folded down into a table position; and FIGS. 13 and 14 are views similar to FIGS. 11 and 12 when the seat back is folded down forwards into an inclined position in order to facilitate access to a space situated behind the seat.

MORE DETAILED DESCRIPTION

Figure 3:
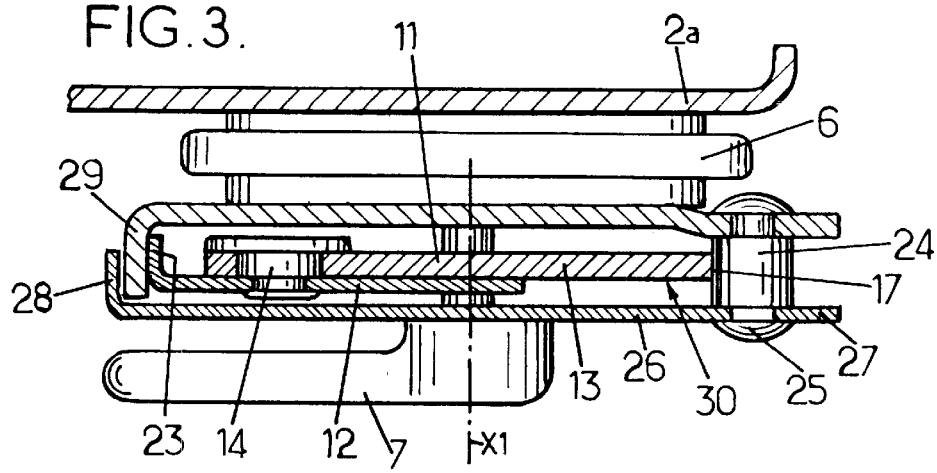
FIG. 3 is a section view on line III—III of FIG. 2.

In the various figures, the same references designate elements that are identical or similar.

FIG. 1 shows a motor vehicle seat 1, e.g. a back seat for a motor vehicle having a passenger compartment in which seats can be rearranged.

This seat comprises a seat proper 2 which is mounted on the floor P of the vehicle and a seat back 3 which is pivotally mounted on the seat proper about a first transverse horizontal axis X1.

The back 3 has a top portion 4 which, in the example shown, includes a headrest and which is mounted to pivot on a bottom portion 5 of the back about a second transverse horizontal axis X2 parallel to the first axis X1 by means of a hinge mechanism 6 controlled by a handle 7 or by any other control member.

Actuating the handle 7 in angular direction 8 releases the entire back 3 to pivot about the axis X1 so that the back then tends to pivot forwards under the effect of resilient means such as torsion bars similar to those described below with reference to the second embodiment of the invention. The passenger of the seat can thus adjust the inclination of its back so as to improve comfort, in conventional manner.

Furthermore, the top portion 4 of the back is pivotally mounted on the bottom portion 5 about a second transverse horizontal axis X2. The top portion 4 of the back is normally maintained in a substantially vertical raised position (as shown in continuous lines in FIG. 1) by means of a locking mechanism described below.

However, the locking mechanism can be moved into a retracted position by acting on a control member such as a lever 9 or the like moving it in the direction of arrow 10, thereby releasing the top portion 4 of the back to pivot about the axis X2 so as to enable the top portion 4 to pivot forwards into a folded-down or "table" position which is shown in chain-dotted lines in FIG. 1, where the top portion of the seat back extends substantially horizontally over the seat proper 2.

As can be seen in FIGS. 2 and 3, the bottom portion 5 of the back has a rigid supporting strength member 5a which, in the example shown, itself comprises two sheet metal side plates 11 perpendicular to the axes X1 and X2 and disposed on either side of the seat, being generally interconnected by means of at least one metal cross-member. The supporting strength member 5a is pivotally connected about the second axis X2 to metal side plates 12 which are parallel to the side plates 11 and which belong to the rigid strength member 4a of the top portion of the back. The supporting strength member 5 is also mounted to pivot on the strength member 2a of the seat proper about the first axis X1 by means of a hinge mechanism 6.

In addition, the above-mentioned locking mechanism which normally locks the top portion 4 of the seat back relative to its bottom portion includes at least one locking cam 13 disposed on one side of the seat.

In the example shown, this locking cam is constituted by a plane metal sheet extending parallel to the above-mentioned side plates 11 and 12 and is pivotally mounted on the side plate 12 of the top portion of the back about a pivot 14 which, for example, is riveted to the cam 13 and to the side plate 12.

The cam 13 extends rearwards in a longitudinal direction Y between a first end 15 close to the pivot 14 and a second end 16 which includes a bearing edge 17, the bearing edge 17 extending a longitudinal guide edge 18 which extends said bearing edge 17 to the first end 15 of the locking cam.

The locking cam 13 can be raised in the direction of arrow 19 to a retracted position, e.g. by means of a Bowden cable 20 actuated by the above-mentioned lever 9. In addition, the locking cam 13 is urged resiliently towards a locking position in the direction opposite to arrow 19, e.g. by means of a spring 21 wound around the pivot 14 and presenting both a first resilient branch bearing against the top edge 22 of the locking cam and a second resilient branch bearing against a folded-down edge 23 of the side plate 12 of the back.

When the seat is in its normal, in-use position, i.e. when the top portion 4 of the back is in its raised position and the locking cam 13 is in its locking position, then the bearing edge 17 of the locking cam is in contact with a peg 24 constituted by the body of a rivet 25 fixed to the side plate 11 of the supporting strength member so that the top portion 4 of the back cannot pivot forwards. The above-mentioned longitudinal direction Y of the locking cam then extends substantially in line with the pivot 14 and the peg 24, and the bearing edge 17 forms a relatively large angle relative to said direction Y, e.g. lying in the range 60° to 80°, extending on a slope so as to become wedged against the peg 24 under the action of the spring 21.

Because of this wedging, any slack due to manufacture or assembly of the various parts is taken up, which means that it is possible to make use of relatively large manufacturing tolerances, which in turn makes it possible to use manufacturing processes that are low in cost.

In addition, the angle of the bearing edge 17 relative to the direction Y is designed in such a manner that when a force is exerted on the top portion 4 of the back without previously actuating the lever 9 so as to raise the locking cam 13, then friction forces between the bearing edge 17 and the peg 24 enable said locking cam 13 to be maintained in its locking position, thus preventing the top portion 4 of the back from pivoting forwards freely.

It should be observed that in the event of an impact, the strength of the locking mechanism is improved because the locking cam 13 is in sliding contact with the side plate 12 of the top portion of the back and is at a short distance from the side plate 11 of the supporting strength member, thereby preventing the cam 13 from deforming freely.

In addition, the strength of the locking mechanism in the event of an accident is further improved by the fact that the side plate of the supporting strength member 5a is secured to an additional sheet metal side plate 26 which covers the bottom portion of the side plate 12 when the top portion 4 of the back is in its raised position. This additional side plate 26 then extends substantially in the above-mentioned longitudinal direction Y between a rear end 27 with the rivet 25 fixed thereto, and a front end forming a folded-down edge 28 which extends substantially perpendicularly to the side plates 11, 12, and 26, and which is welded, for example, to a folded-down edge 29 formed at the front end of the side plate 11 of the supporting strength member.

In this way, the side plates 11 and 26 together form a housing which defines a vertical gap 30 in which the bottom portion of the side plate 12 is engaged together with the cam 13 when the top portion 4 of the seat back is in its raised position and the cam 13 is in the locking position. The side plate 12 and the cam 13 are inserted via the gap 30 with a small amount of space on either side of the cam 13, said empty space having a thickness of less than 3 mm, for example.

In addition, when the top portion 4 of the back is in its raised position, the folded-down edge 23 of the side plate 12 comes into abutment against the folded-down edge 29 of the side plate 11, thereby preventing the top portion 4 of the back from pivoting freely in a rearward direction.

The above-described device operates as follows.

When a user seeks to fold down the top portion 4 of the seat back to form a table, the lever 9 that can be seen in FIG. 1 is operated so as to raise the locking cam 13 in the direction of arrow 19 that can be seen in FIG. 2 so that said locking cam moves into a retracted position where its bearing edge 17 no longer interferes with the peg 24.

Figure 4:
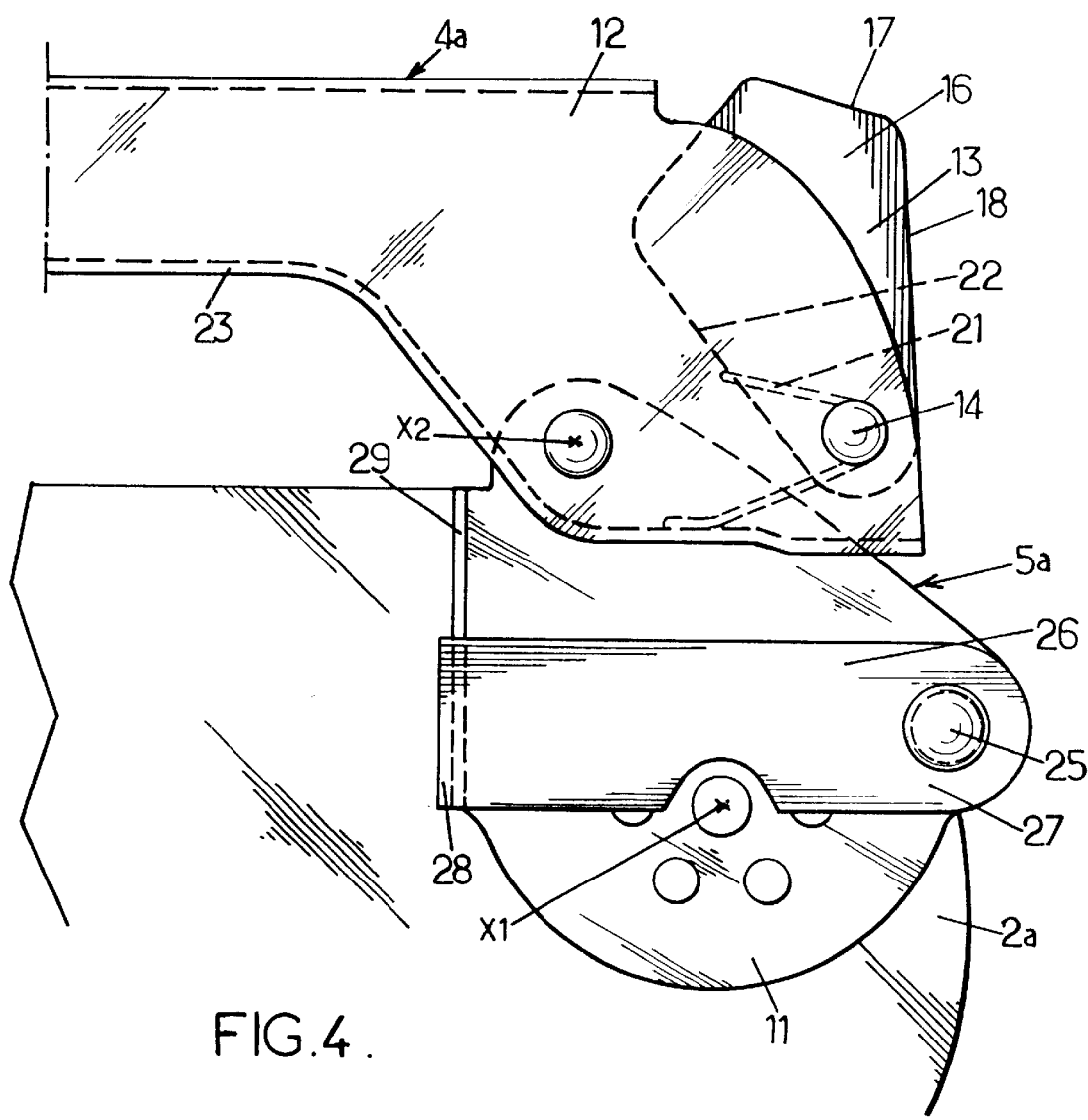
FIG. 4 is a view similar to FIG. 3 when the top portion of the seat back is folded down forwards into a table position.

The user can then cause the top portion 4 of the back to tilt into a position that is substantially horizontal, as shown in FIG. 4.

In this position, the locking cam 13 can, where appropriate, be caused to bear against an abutment such as a folded-down tab 31 formed at the bottom portion of the side plate 12.

Figure 5:
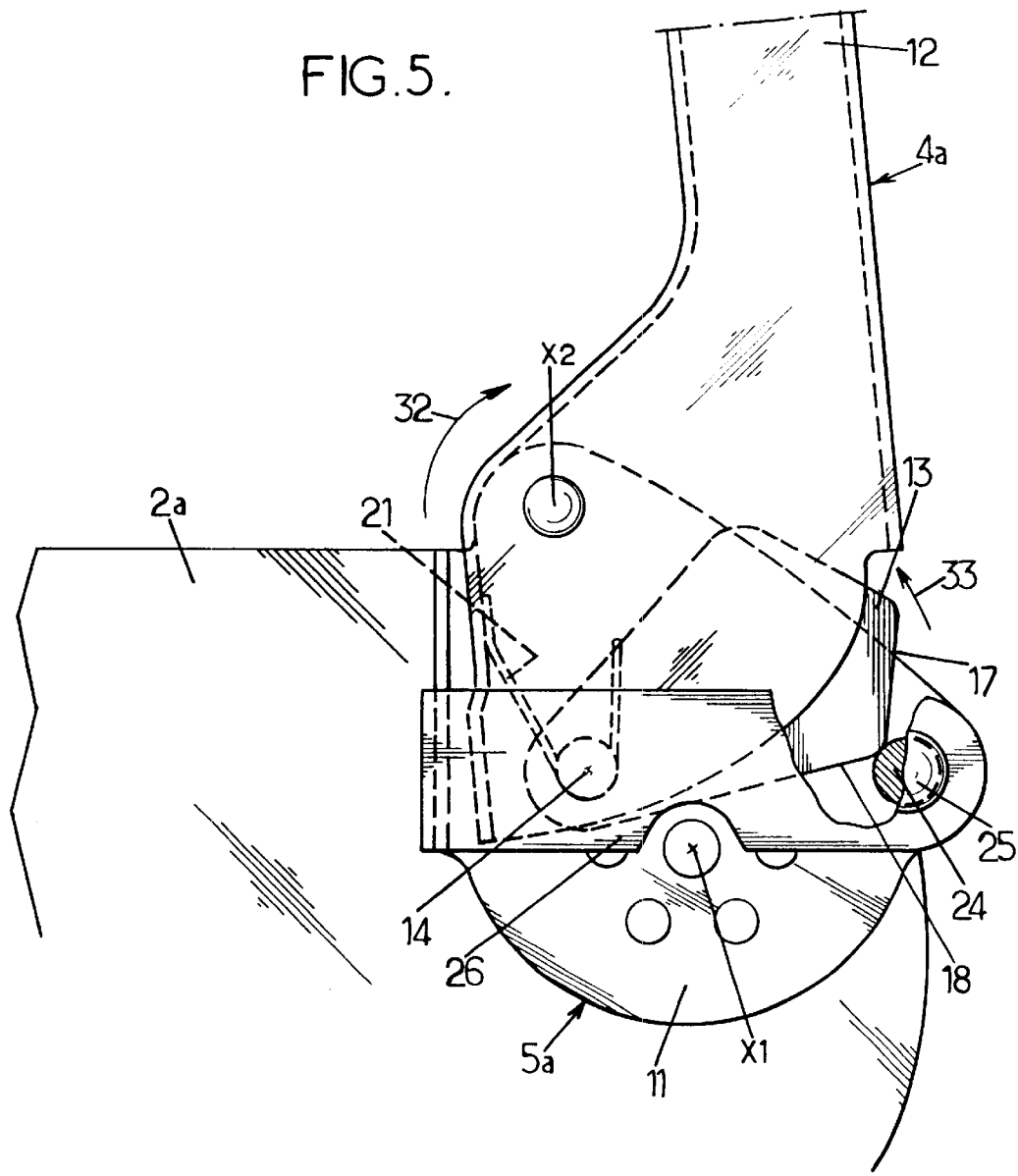
FIG. 5 is a view similar to FIG. 4, when the top portion of the seat back is raised after being folded down forwards into a table position.

Starting from this table or folded-down position, when a user of the seat seeks to return the top portion 4 of the back into the raised position, the top portion 4 is caused to pivot about the axis X2 in the direction of arrow 32 that can be seen in FIG. 5.

During this movement, the guide edge 18 of the cam slides against the peg 24, raising the locking cam 13 in the direction of arrow 33. When the rear end of the guide edge 18 has gone past the peg 24, the locking cam 13 pivots downwards in the direction opposite to arrow 33 under drive from the spring 21, such that the bearing edge 17 of the locking cam returns to become wedged against the peg 24, thereby locking the top portion of the back in its raised position.

The second embodiment of the invention is described below with reference to FIGS. 6 to 12.

Figure 6:
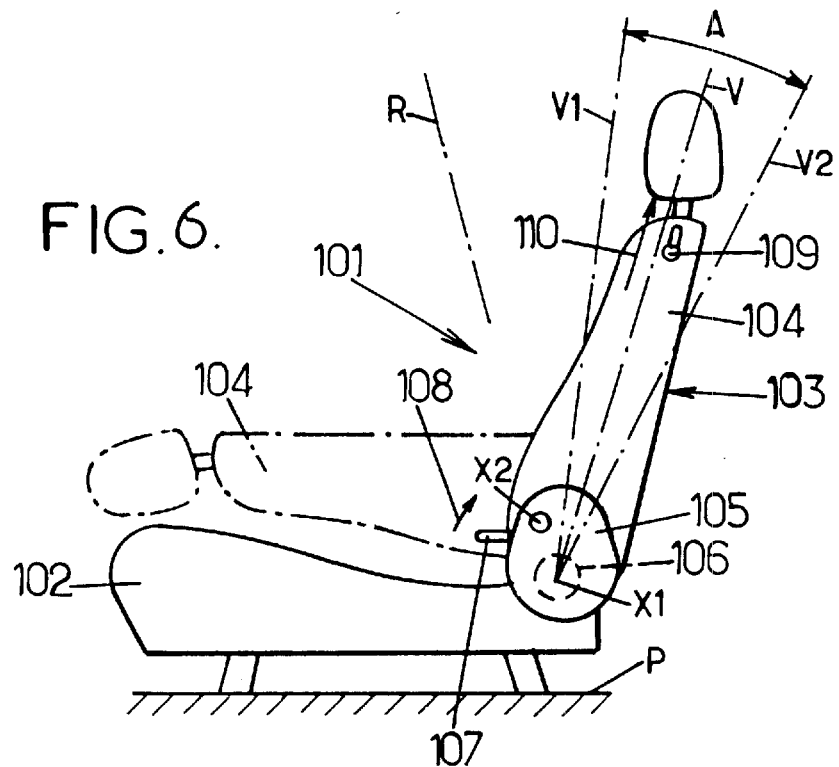
FIG. 6 is a diagrammatic view of a vehicle seat constituting a second embodiment of the invention.

FIG. 6 shows another motor vehicle seat 101, e.g. a back seat for a motor vehicle having a passenger compartment in which seats can be rearranged, and in particular a second row seat that is intended to occupy a position where it is partially in register with a side door of the vehicle that also gives access to back seats constituting a third row in the vehicle.

The seat 101 comprises a seat proper 102 which is mounted on the floor P of the vehicle, either via removable legs, or else via sliding runners. In addition, a back 103 is pivotally mounted on the seat proper about a transverse horizontal axis X1.

The back 103 has a top portion 104 which, in the example shown, includes a headrest, and it is mounted to pivot on a bottom portion 105 of the seat back about a second transverse horizontal axis X2 which is parallel to the first axis X1 by means of a hinge mechanism 106 under the control of a handle 107 or of some other control member.

Actuating the handle 107 in angular direction H serves to release the entire back 103 to pivot about the axis X1 so that the back 103 as a whole tends to pivot forwards under the effect of resilient means such as torsion bars described below. The seat passenger can thus adjust the inclination of the back by pushing the back rearwards or on the contrary allowing it to move forwards. As shown in FIG. 6, the longitudinal axis V of the back, e.g. passing through the axis X1 and the top of the headrest, can thus be adjusted over an angular range A between a forward stop position V1 and a rearward stop position V2, so as to enable passenger comfort to be improved.

The top portion 104 of the back is pivotally mounted on its bottom portion 105 about a second transverse horizontal axis X2. The top portion 104 of the back is normally held in a raised position (as shown in continuous lines in FIG. 6) relative to the bottom portion 105 by means of a locking mechanism that is described below.

The locking mechanism can be moved into a retracted position when actuating the handle 107 in angular direction 108, thereby releasing the top portion 104 of the back to pivot about the axis X2, said top portion 104 nevertheless being prevented from pivoting rearwards relative to the bottom portion 105 by stop means that are described below.

Given these stop means, and given the resilient urging applied to the bottom portion 105 of the back and tending to cause said bottom portion 105 to pivot forwards, the top portion 104 of the back remains in its raised position relative to the bottom portion 105 when a passenger is seated on the seat, since the top portion 104 of the back then bears against the passenger's own back.

In contrast, when a user actuates the handle 107 in the direction 108 while not present on the seat, then the bottom portion 105 of the back pivots forwards under drive from its own resilient means until it reaches the angular position V1 shown in FIG. 6, and the top portion 104 of the back pivots freely forwards all the way to the position in which it is folded down so as to constitute a table as shown in chain-dotted lines in FIG. 6.

Furthermore, the seat also has a second control member 109 such as a lever or the like which can be moved in the direction of arrow 110 to unlock the hinge mechanism 106 and allow the entire back 103 to be pivot forwards beyond the above-mentioned forward adjustment position V1 until it reaches a forwardly inclined position R, e.g. giving easier access to the seats in the third row of the vehicle.

Figure 8:
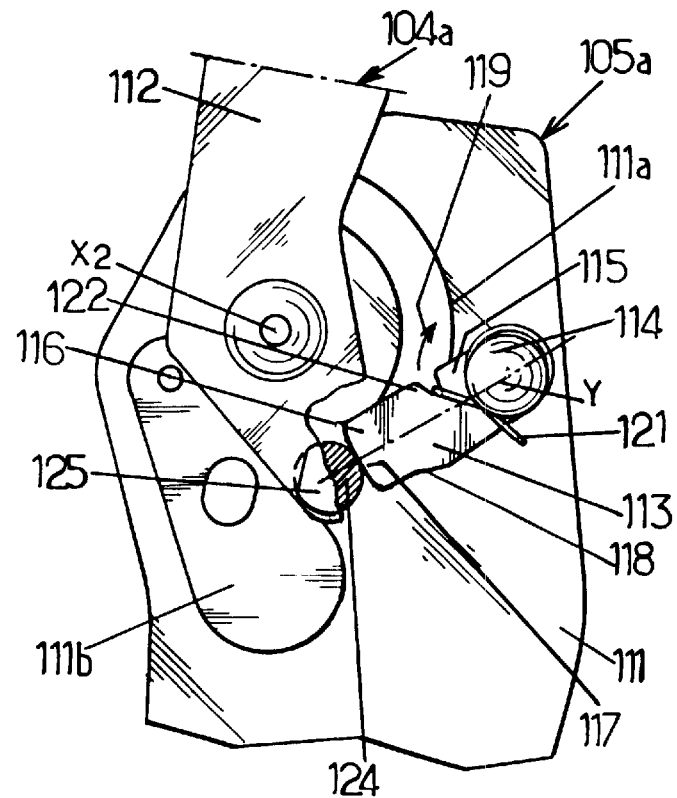
FIG. 8 is a cutaway detail view of the FIG. 7 device.
Figure 7:
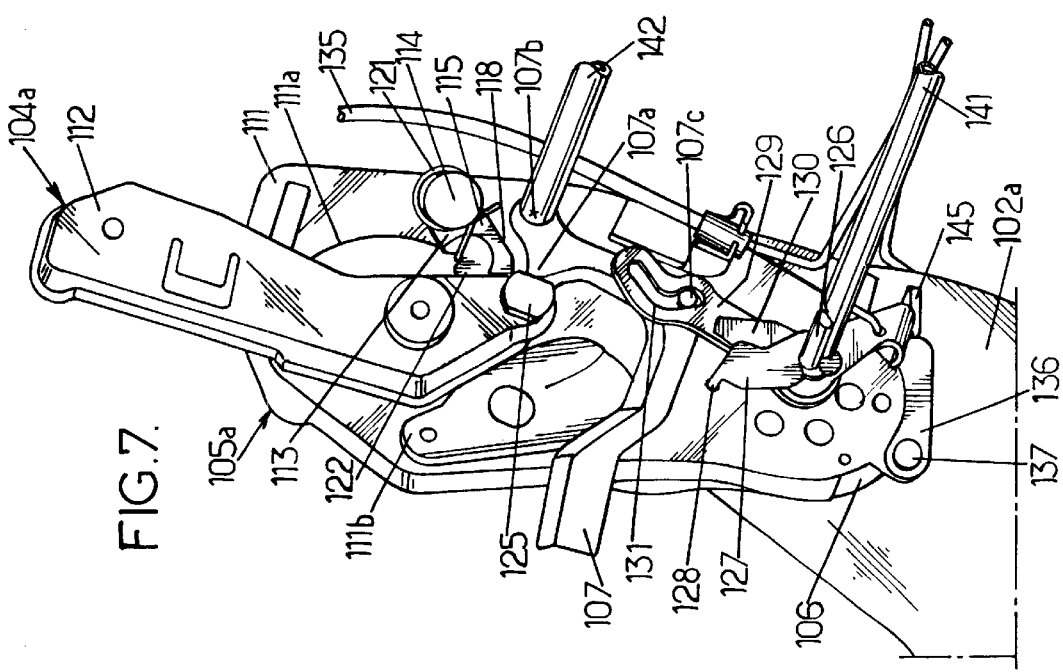
FIG. 7 is a detail perspective view showing the portion of the strength member of the FIG. 6 seat back, from one side of the FIG. 6 seat, shown in its normal, in-use position.
Figure 9:
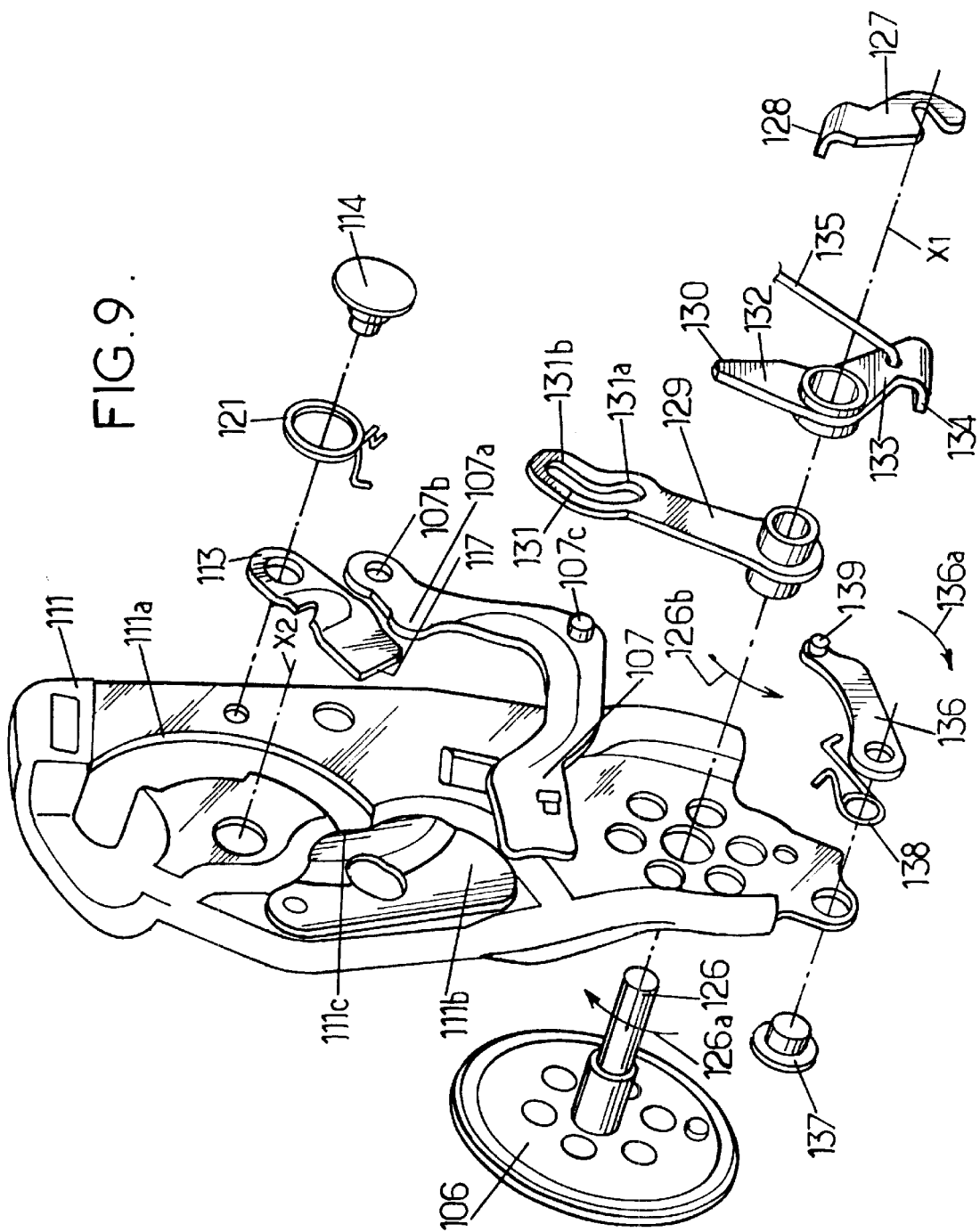
FIG. 9 is an exploded view of a portion of the FIG. 7 device.

As shown in FIGS. 7, 8, and 9, the bottom portion 105 of the back has a rigid supporting strength member 105 which, in the example shown, itself comprises two sheet metal side plates 111 perpendicular to the axes X1 and X2 and located on either side of the seat. This supporting strength member 105a is pivotally connected about the second axis X2 to metal side plates 112 which are parallel to the side plates 111 and which belong to the rigid strength member 104a of the top portion of the back.

Each side plate 112 of the top portion of the back is guided in its pivoting movement about the axis X2 by means of a rigid peg 124, e.g. belonging to a rivet 125 or the like, which is fixed to the bottom portion of the side plate 112, said peg 124 sliding in a circular slot 111a centered on the axis X2.

Furthermore, a reinforcing metal sheet 111b can advantageously be fitted on the side plate 111 by riveting, welding, etc., so as to co-operate with the side plate 112 by coming into abutment therewith when the top portion 104 of the back is in its raised position relative to the bottom portion 105 so as then to prevent said top portion 104 from pivoting rearwards. The pivoting movement of the top portion 104 of the back in a rearward direction is also prevented by the peg 124 coming into abutment against the front end 111c of the slot 111a (see FIG. 9), this front end 111c itself being reinforced by the above-mentioned reinforcing metal sheet 111b.

Furthermore, the above-mentioned locking mechanism which normally holds the top portion 104 of the back relative to the bottom portion 105 comprises at least one locking cam 113 placed on the same side of the seat as the handle 107.

In the example shown, this locking cam 113 is constituted by a metal sheet extending parallel to the above-mentioned side plates 111 and 112 and which is mounted to pivot on the side plate 111 of the bottom portion of the back about a pivot 114 which, for example, is riveted to the cam 113 and the side plate 111.

The cam 113 extends in a longitudinal direction Y between a first end 115 close to the pivot 114 and a second end 116 having a bearing edge 117 for wedging against the peg 124, the bearing edge 117 extending a longitudinal guide edge 118 which itself extends from said bearing edge 117 to the first end 115 of the locking cam.

The locking cam 113 can be raised in the direction of arrow 119 into a retracted position, by a projecting edge 107 belonging to the handle 107 coming into abutment, said handle 107 optionally being in the form of a cutout and stamped piece of sheet metal pivotally mounted on the side plate 111 by means of a pivot 107b.

In addition, the locking cam 113 is urged resiliently towards its locking position in the opposite direction to arrow 119, e.g. by means of a spring 121 round around the pivot 114 and having a first resilient branch bearing against the top edge 122 of the locking cam and a second resilient branch connected to the side plate 111.

In the normal, in-use position of the seat, i.e. when the top portion 104 of the back is in its raised position and the locking cam 113 is in its locking position, the bearing edge 117 of the locking cam is in contact with the peg 124, thus preventing the top portion of the back 104 from pivoting forwards. In this position, the above-mentioned longitudinal direction Y of the locking cam extends substantially in alignment with the pivot 114 and the peg 124, and the bearing edge 117 forms a relatively large angle with said direction Y, e.g. an angle of about 80°, extending on a slope so as to become wedged against the peg 124 under drive from the spring 121.

This wedging serves to take up any slack due to manufacture and assembly of the side plates 111, 112 and of the cam 113, thus making it possible to make use of relatively large manufacturing tolerances, in turn making it possible to use processes that are inexpensive.

Furthermore, the angle of the bearing edge 117 relative to the direction Y is chosen so that when a force is exerted on the top portion 104 without previously actuating the handle 107 to raise the locking cam 113, then friction forces between the bearing edge 117 and the peg 124 enable said locking cam 113 to be maintained in its locking position, thus preventing the top portion 104 of the back from pivoting freely forwards.

It should be observed that in the event of an impact, the strength of the locking mechanism is improved by the fact that the locking cam 113 is in sliding contact with the side plate 111 of the bottom portion of the back and is partially covered by the side plate 112 of the top portion of the back (when the top portion of the back is in its raised position relative to the bottom portion and when the locking cam is in its locking position), the side plate 112 then preferably being spaced apart from the locking cam 113 by a small amount, less than 3 mm.

Furthermore, as shown in FIGS. 7 and 9, each side plate 11 of the bottom portion of the back is connected to a side plate 102a belonging to the rigid strength member of the seat proper by means of an above-mentioned hinge mechanism 106 which can be actuated by a rotary drive member such as a drive shaft 126 which can be moved between:

a locking position in which the hinge mechanism 106 is locked and prevents the bottom portion 105 of the back from pivoting about the axis X1; and an unlocking position in which the hinge mechanism 106 is unlocked and thus enables the bottom portion 105 of the back to pivot about the axis X1.

The drive shaft 126 is urged by one or more springs inside the hinge 106 towards its locking position, in the direction of arrow 126a that can be seen in FIG. 9.

In the example shown in FIGS. 7 and 9, the hinge mechanism 106 is fixed on the outside of the side plate 111.

In addition, on the side of the seat which has the handle 107, the drive shaft 126 of the hinge mechanism is secured, e.g. by welding, to a lever 127 disposed on the inside of the seat relative to the side plate 111.

This lever 127 can be in the form, for example, of a piece of cutout and folded sheet metal which presents a folded-down tab constituting a finger 128 which projects towards the side plate 111. Between the lever 127 and the side plate 111, two control levers 129 and 130, e.g. made out of metal, are also mounted to pivot freely about the drive shaft 126, these levers 129, 130 being mounted so as to come into abutment against the finger 128 of the lever 127 and thus drive the drive shaft 126 in pivot direction 126b opposite to above-mentioned direction 126a whenever one of the two levers 129, 130 itself pivots in the direction 126b.

The lever 129 has a curved slot 129a in which there slides a peg 107c which is secured to the handle 107. The curved slot 131 of the lever 129 has two branches 131a and 131b respectively constituting a bottom branch and a top branch, these branches being disposed substantially in a V configuration that is open towards the back of the seat, the lever 129 itself sloping slightly towards the back of the seat in the normal, in-use position. In addition, in the normal, in-use position of the seat and in the absence of the handle 107 being actuated, the peg 107c of the handle lies in the bottom branch 131a of the slot 131 close to the bottom end of said branch.

Furthermore, the lever 130 has a top arm 132 which is adapted to come into abutment against the finger 128 of the lever 127 when the lever 130 pivots in above-mentioned direction 126b, and a bottom arm 133 which terminates in a tab 134 folded towards the side plate 111. In addition, the bottom arm 133 of the lever 130 is fixed to the end of a Bowden cable 135 which is connected to the lever 109 shown in FIG. 6 so as to cause the lever 130 to pivot in the direction 126b (FIG. 9) when the lever 109 is moved in the direction of arrow 110 as can be seen in FIG. 6.

Furthermore, as shown in FIGS. 7 and 9, a retractable stop piece 136, e.g. implemented in the form of a piece of cutout sheet metal, is mounted at the bottom portion of the side plate 111 on a pivot 137, this stop piece 136 being urged in angular direction 136a, i.e. downwards, by means of a spring 138. At its end furthest from the pivot 137, the stop piece 136 has a peg 139 which comes to bear against the folded-down tab 134 of the lever 130.

Figure 10:
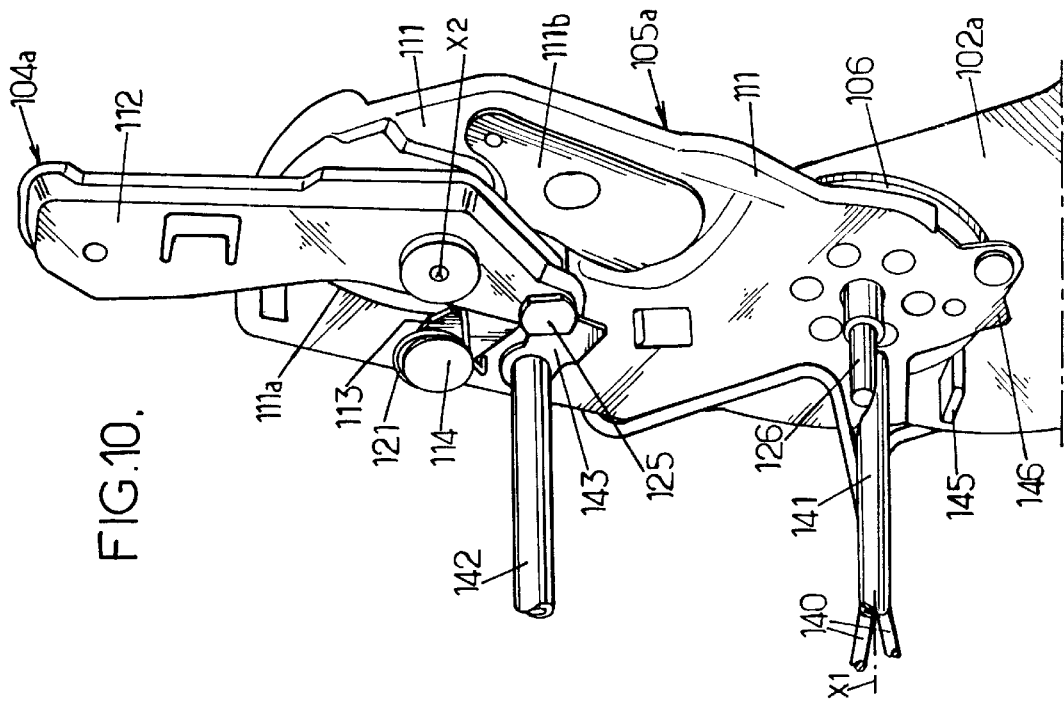
FIG. 10 is a view similar to FIG. 7, showing the other side of the seat.

In addition, as can be seen in FIGS. 7 and 10, each of the side plates 111 is urged forwards about the axis X1 by means of a torsion bar 139 which bears against the side plate 102a of the seat proper on its side opposite from the seat.

Furthermore, a rigid link bar 141 interconnects the drive shaft 126 of the hinges 106 on either side of the seat so that these hinges are locked and unlocked simultaneously, and a rigid link bar 142 interconnects the handle 107 and a control piece 143 on the side plate 111 which does not carry the handle 107, this control piece 143 being adapted to move a locking cam 113 into its retracted position, which cam is identical to the cam 113 described above except that it is mounted on the side plate 111 which does not have a handle 107. This additional locking cam 113 is mounted in the same manner as above-described cam 113 and it co-operates in the same manner with a peg 124 secured to a rivet 125 or the like identical to that described above and mounted at the bottom portion of the corresponding side plate 112.

The above-described device operates as follows.

When a user actuates the handle 107 in the direction 108, as shown in FIG. 11, the peg 107c of the handle slides in the slot 131 of the lever 129 to the end of the top branch 131b thereof. This causes the control lever 129 to pivot in direction 126b so that this lever comes to bear against the finger 128 of the lever 127 and causes the drive shafts 126 of the two hinges 106 of the seat to move into the unlocking position: as a result the bottom portion 105 of the back can pivot freely about the axis X1. In contrast, the control lever 130 and the retractable stop 136 remain unmovable.

Furthermore, during the movement of the handle 107, the projecting portion 107a of said handle comes to bear against the guide edge 118 of the corresponding locking cam 113, thereby moving said locking cam 113 into the retracted position. Similarly, the above-mentioned control piece 143 moves the locking cam 113 into the retracted position on the opposite side of the seat. The top portion 104 of the back is thus likewise free to pivot about the axis X2. When a user is seated on the seat, as in the case of FIG. 11, then the user's own back nevertheless retains the top portion 104 of the seat back in its raised position such that it is the entire back 103 which pivots about the axis X1. This pivoting is limited in a forward direction by the retractable stop 136 whose free end comes into abutment against a fixed stop 145 of the side plate 102a of the seat proper once the back reaches the position V1 shown diagrammatically in FIG. 6 (the retractable stop 136 also comes into contact with the fixed stop 145 when the back is raised but adjusted to be in the furthest forwards position, as shown in FIG. 7, for example; when the back is raised but is not in its forward stop position, then the retractable stop is in a position where it is spaced apart from the fixed stop 145, towards the front of said fixed stop).

Furthermore, as shown in FIG. 12, when a passenger is not present on the seat and the handle 107 is actuated, then the top portion 104 of the seat back likewise pivots forwards in the direction of arrow 144 about the axis X2 so that this top portion becomes folded down into a table position.

During this movement, the peg 124 slides upwards in the slot 111a of the side plate 111 while sliding over the guide edge 118 of the corresponding locking cam 113.

Starting from the position shown in FIG. 12, when it is desired to return the seat into the normal in-use position, it suffices to raise the top portion 104 of the back so that the locking cam 113 returns to wedge against the peg 124, and so that the seat returns to its normal in-use position as shown in FIG. 7.

As shown in FIG. 13, when it is desired to move the back 103 as a whole into the forwardly tilted position R as shown in FIG. 6, then it is the lever 109 which needs to be moved in the direction of arrow 110 so as to apply traction on the Bowden cable 135 and cause the lever 130 to pivot in the direction of arrow 136a. The top arm 132 of the lever 130 then comes into abutment against the finger 128 of the lever 127, thereby causing the drive shafts 126 of the two hinge mechanisms 106 to move into the unlocking position so as to allow the back 103 to pivot as a whole about the axis X1. In contrast, the lever 129 remains stationary and the locking cams 113 remain in the locking position.

In addition, the folded-down tab 134 of the lever 130 lifts the retractable stop 136 which no longer co-operates with the fixed stop 145 of the side plate of the seat proper so that the seat back can pivot forwards beyond the position V1 shown in FIG. 6, with the above-mentioned forwardly-sloping position R being reached when a bottom portion 146 of each side plate 111 comes into abutment against the corresponding fixed stop 145, as shown in FIG. 14.

It will be observed that the stop 136 could be movable in a movement other than rotation. In addition, this stop 136 could, where appropriate, be mounted to move relative to the seat proper 102 if the rest position of the drive shaft 126 is fixed relative to the seat proper: under such circumstances, the fixed stop 145 would be carried by the supporting strength member 105a.

What is claimed is:

1. A vehicle seat comprising a back and a seat proper, the back having at least a top portion mounted on a supporting strength member to pivot about a transverse horizontal pivot axis, said supporting strength member being connected to the seat proper, said top portion of the back being connected to the supporting strength member by a locking mechanism adapted to connect the top portion of the back to the supporting strength member at least in a raised, normal-use position, the locking mechanism being actuated by a control member accessible to a user to release the top portion of the back to pivot about said pivot axis, at least in order to enable it to pivot forwards from the raised position to a folded-down position, wherein the locking mechanism comprises a locking cam pivotally mounted on a first seat element selected from the supporting strength member and the top portion of the back, the locking cam being urged resiliently towards a locking position and being movable towards a retracted position by actuating said control member, which member is carried by said first seat element, the locking cam having a bearing edge and a guide edge, and said locking cam being positioned and shaped so that:

when the top portion of the back is in the raised position and the locking cam is in the locking position, the bearing edge of said locking cam is wedged against a rigid peg fixed to a second seat element selected from the supporting strength member and the top portion of the back, said second seat element being different from the first seat element, the locking cam then preventing the top portion of the back from being folded down forwards and said top portion of the back then co-operating with the supporting strength member by coming into abutment therewith to prevent said top portion of the seat back from pivoting rearwards;

when the locking cam is in the retracted position, it does not interfere with said peg and it enables the top portion of the seat back to pivot from its raised position to its folded-down position; and when the top portion of the back is in the folded-down position, said back can be raised freely, the locking cam then being disposed so that it does not lock against the peg, said locking cam being disposed so that its guide edge is in sliding contact against the peg at least during a portion of the raising stroke of the top portion of the back, the locking cam and the peg being disposed so that the peg slides along the guide edge of the locking cam towards the bearing edge when the top portion of the back pivots towards its raised position, the bearing edge of the locking cam being adapted to wedge against the peg when the top portion of the back returns to its raised position.

2. A seat according to claim 1, in which the locking cam extends in a longitudinal direction between a first end pivotally mounted on the first element of the seat and a second end which includes the bearing edge of the locking cam, the guide edge of the locking cam extending between said first end and the bearing edge, the cam thus being braced against the peg of the second element of the seat while said locking cam is in the locking position, and the top portion of the back is in the raised position.

3. A seat according to claim 1, in which the bearing edge of the cam is shaped in such a manner that said locking cam cannot itself pass into the retracted position without a user actuating the control member when the bearing edge of the locking cam is wedged against the peg of the second element of the seat.

4. A seat according to claim 1, in which the locking cam is a piece of sheet metal having first and second main faces, the first main face of the locking cam being in sliding contact against a first side plate belonging to the first element of the seat and extending parallel to the locking cam.

5. A seat according to claim 4, in which the second element of the seat comprises a second rigid side plate which is parallel to the first side plate and which is secured to said peg, the locking cam being located at least in part between the first and second side plates, at least when the locking cam is in the locking position and the top portion of the back is in the raised position.

6. A seat according to claim 5, in which the second side plate is spaced apart from the second main face of the locking cam by a distance which is less than 3 mm.

7. A seat according to claim 5, in which the second element of the seat includes a third side plate which is parallel to the first and second side plates, the second and third side plates being fixed to each other and defining between them a gap in which the first side plate and the locking cam are received, at least when the locking cam is in the locking position and the top portion of the back is in the raised position.

8. A seat according to claim 7, in which the second and third side plates are fixed to each other, firstly via the peg and secondly via at least one link wall which interconnects the second and third side plates and which co-operates with the first side plate by coming into abutment therewith to prevent rearward pivoting of the top portion of the back when said top portion of the back is in the raised position.

9. A seat according to claim 1, in which the first element of the seat is constituted by the top portion of the back and the second element of the seat is constituted by the supporting strength member.

10. A seat according to claim 1, in which the first element of the seat is constituted by the supporting strength member and the second element of the seat is constituted by the top portion of the back.

* * * * *